United States Patent [19]
Ritola et al.

[11] Patent Number: 5,685,410
[45] Date of Patent: Nov. 11, 1997

[54] INFEED CONVEYOR SYSTEM

[75] Inventors: Edward W. Ritola, LaCenter; Petri Saastamo; Lloyd Booth, both of Woodland, all of Wash.

[73] Assignee: U.S. Natural Resources, Inc., Vancouver, Wash.

[21] Appl. No.: 707,177

[22] Filed: Sep. 3, 1996

[51] Int. Cl.⁶ .................................................. B65G 47/26
[52] U.S. Cl. ...................... 198/457; 198/456; 198/461.2
[58] Field of Search ...................... 198/403, 432, 198/444, 456, 457, 459.1, 460.1, 461.1, 461.2, 461.3, 463.2, 463.3

[56] References Cited

U.S. PATENT DOCUMENTS

| | | | |
|---|---|---|---|
| 3,938,650 | 2/1976 | Holt | 198/461.2 X |
| 4,386,641 | 6/1983 | Horn | 198/457 X |
| 4,838,408 | 6/1989 | Brawn | 198/459.1 X |
| 5,341,915 | 8/1994 | Cordia et al. | 198/460.1 |

FOREIGN PATENT DOCUMENTS

| | | | |
|---|---|---|---|
| 4341418 | 11/1992 | Japan | 198/460.1 |

*Primary Examiner*—James R. Bidwell
*Attorney, Agent, or Firm*—Robert L. Harrington

[57] ABSTRACT

A conveyor system incorporating conveyors operating in conjunction for conveying, arranging, positioning and placing boards for feeding boards in an end to end arrangement to a processing station. The system includes a descrambler for feeding boards sequentially in a crosswise orientation onto a lug type conveyor. The lugs of the lug type conveyor conveys the boards through a scanner where the boards are scanned and the data input to a computer. A speed up conveyor cooperates with the lug conveyor to advance the board against a preceding lug of the lug conveyor which restrains the board. A board turner is provided to turn the board over if required. The speed up conveyor conveys the board onto a positioning conveyor and advances the board against a lug which retains the board in a determined position. Positioning pins advance the board onto a longitudinal conveyor which conveys the boards along their longitudinal length. The conveyors are cooperatively arranged to minimize the spacing between boards placed on the longitudinal conveyor.

8 Claims, 4 Drawing Sheets

INFEED CONVEYOR SYSTEM

FIELD OF THE INVENTION

This invention is directed to a system of cooperating conveyors and associated mechanisms for conveying, arranging, positioning and placing boards for optimum feeding of the boards to a board processing station, e.g., a saw for edging.

BACKGROUND OF THE INVENTION

The production of boards from logs involves many steps. Boards are initially rough sawn from a log and then directed through a series of operations to cut the boards to length and width and in the process separating the boards by grade. In between operations, the boards may be gathered randomly in a temporary storage area while awaiting the next operation. As required, they are pulled out of the storage area, typically by an apparatus referred to as a descrambler, and then conveyed in a crosswise orientation through scanners and the like until the processing station is reached. At that point the boards are deposited on an infeed conveyor that feeds the boards lengthwise into a processing machine, e.g., the saw.

Efficiency of operation dictates that the successive boards being fed lengthwise to the saws should be as close together as can be achieved. A major problem in minimizing the spacing between the boards occurs at the point where the boards are deposited from the crosswise conveyor mechanism to the lengthwise conveyor mechanism. The boards are deposited on the lengthwise conveyor one aligned behind the other. A first board from the crosswise conveyor is placed on the lengthwise conveyor which is conveying the boards at a right angle compared to the direction of conveyance of the crosswise conveyor. The next board has to be held back until the length of that next board is cleared by the first board. The next board is then moved onto the lengthwise conveyor and the process repeated.

The problem occurs in the length of time it takes to position the "next" board onto and into the control of the lengthwise conveyor. During that positioning process, the first board continues to travel through the processing apparatus and a space is created. A time lag is then developed between successive boards and this time lag represents a substantial cost in processing of the boards. The present invention is directed toward reducing this time lag.

BRIEF DESCRIPTION OF THE INVENTION

A far greater number of boards can be conveyed in a single file crosswise orientation than in a single file lengthwise orientation. Consider boards 20' long and 6" wide and the conveyor speed being the same for both lengthwise and crosswise conveyance. In the same time that one board would be conveyed lengthwise a given distance, forty boards would be conveyed that same distance if conveyed crosswise.

In the preferred embodiment of the present invention, the boards are conveyed crosswise and several operations are conducted during crosswise conveyance preparatory to sawing. The boards are individually scanned while traveling crosswise. The scanning operation determines the desired cutting pattern of the saw. It also can determine board configuration including length and width and it can determine board profile and thus which side of the board is preferably on top (or bottom) for sawing. The boards following scanning are then turned if required, positioned for placement on the lengthwise conveyor and then placed on the lengthwise conveyor in a desired orientation for cutting the desired cutting pattern.

Problems that occur are as follows: Boards are not consistently placed on the crosswise conveyor by the descrambler. Gaps may thus occur between the individual boards on the crosswise conveyor and this can translate into an undesired full board length gap between the boards when placed on the lengthwise conveyor. Scanning the boards requires some concession in spacing and conveyor speed, and turning the board is preferably accomplished with the board at a stationary position. Stopping or slowing the conveyor when that conveyor is the same conveyor that places the boards on the lengthwise conveyor creates further undesired gaps.

The preferred embodiment of the invention, at least in part, solves the problems stated above with the use of multiple conveyors. A first conveyor receives the boards from the descrambler and moves the boards individually along the conveyor path with lugs that engage the trailing side edges of the boards. The first conveyor moves the boards through the scanner. After scanning, a second friction-gripping conveyor joins the first conveyor. The friction gripping conveyor runs faster than the first conveyor and moves the boards ahead of the lugs of the first conveyor and into abutment with the preceding lugs of the first conveyor.

If a board requires turning, when the board turning station is reached, the first conveyor (of the preferred embodiment) stops and the preceding lug against which the board is in engagement holds the board in the desired position and the board is flipped over backwards. The friction gripping second conveyor assists this operation in that the leading side edge of the board is raised upwardly off the second conveyor while the trailing side edge is urged in the forward direction so that the trailing edge is moving forward against the lug and thus becomes the leading edge.

The first conveyor is restarted and the board continues toward the lengthwise conveyor. Before reaching the lengthwise conveyor, a third positioning conveyor, also having lugs, enters the conveyor path while the first conveyor leaves the path. The second conveyor continues to run and now holds the boards against the lugs of the positioning conveyor. The positioning conveyor's start-stop movements are controlled by the computer to place the board at a desired position relative to the lengthwise conveyor. The boards may be different widths, e.g., between 4" and 12". It may be determined that the optimum placement for the board in waiting is 8" from the trailing side edge of the preceding board (which board is in the process of being conveyed by the lengthwise conveyor toward the saw). The computer has recorded the width of the preceding board and thus can position the holding lug of the positioning conveyor and thus the board at exactly the desired 8" spacing.

There is a final placement mechanism that includes linerally movable placement posts. The placement posts or pins are movable in a reciprocating path that retracts below the conveyor path as it travels to a position behind the boards and then emerges behind the board and engages the trailing side edge. Cushioning posts are positioned at the leading side edge to prevent overthrow of the boards, i.e., the placement posts push the boards against the cushioning posts which resistively retract, e.g., through spring action provided by air cylinders. As soon as the preceding board has cleared the length of the "held" board, the positioning conveyor moves out of the path of conveyance and the reciprocating placement posts engage and rapidly move the board against the cushioning posts and at the desired position over the lengthwise conveyor where the board is clamped against the lengthwise conveyor by overhead rollers and conveyed into the saws.

Whereas the first conveyor is independently operated and is not part of the positioning and placement operations, it can be operated to more efficiently receive boards from the descrambler, position boards under the scanner and over the board turner. For example, should the descrambler fail to place a board on the conveyor, a lug on the conveyor would run empty if not stopped. The first conveyor is therefore stopped so as to avoid the empty lug. Preferably the scanner and board turner are strategically located so that at such a stopped position, a board will not be located in the scanner and a board will be located over the board turner. (Preferably scanning is accomplished during movement of the boards and board turning is accomplished with the board stationary.)

The benefits and advantages of the above-described features and others not hereinabove described will be more apparent upon reference to the following detailed description having reference to the accompanying drawings.

DESCRIPTION OF THE PREFERRED EMBODIMENT

Figure 1:
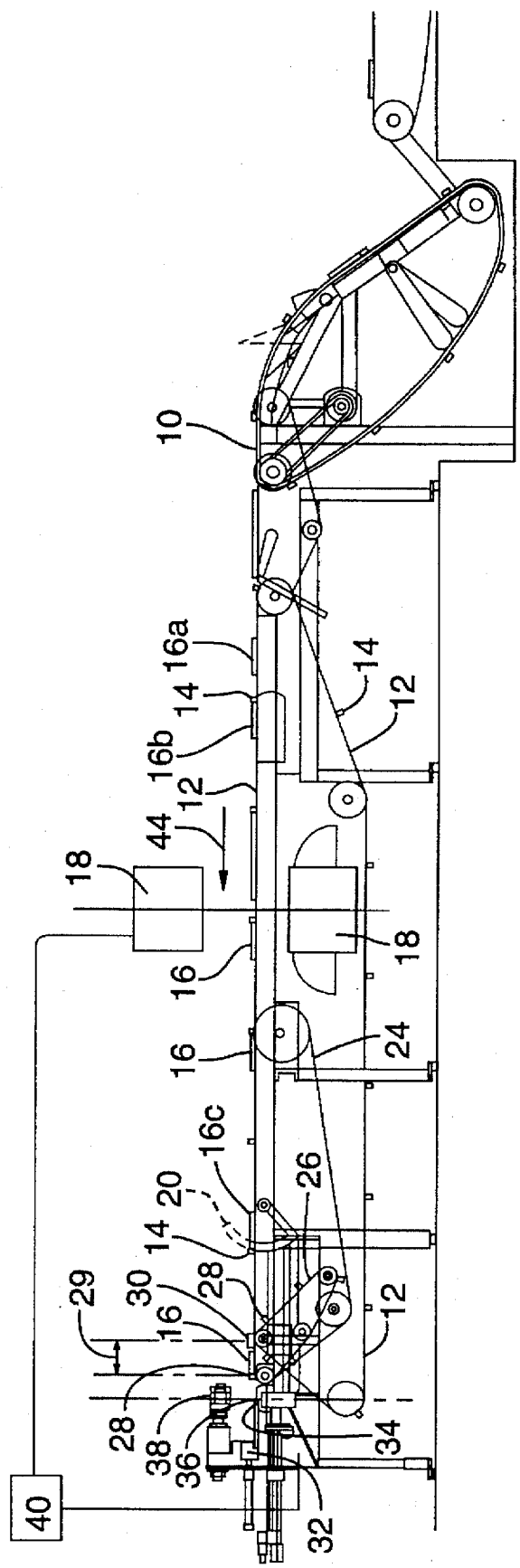
FIG. 1 is a side elevation view of an infeed conveyor system in accordance with the present invention.
Figure 2:
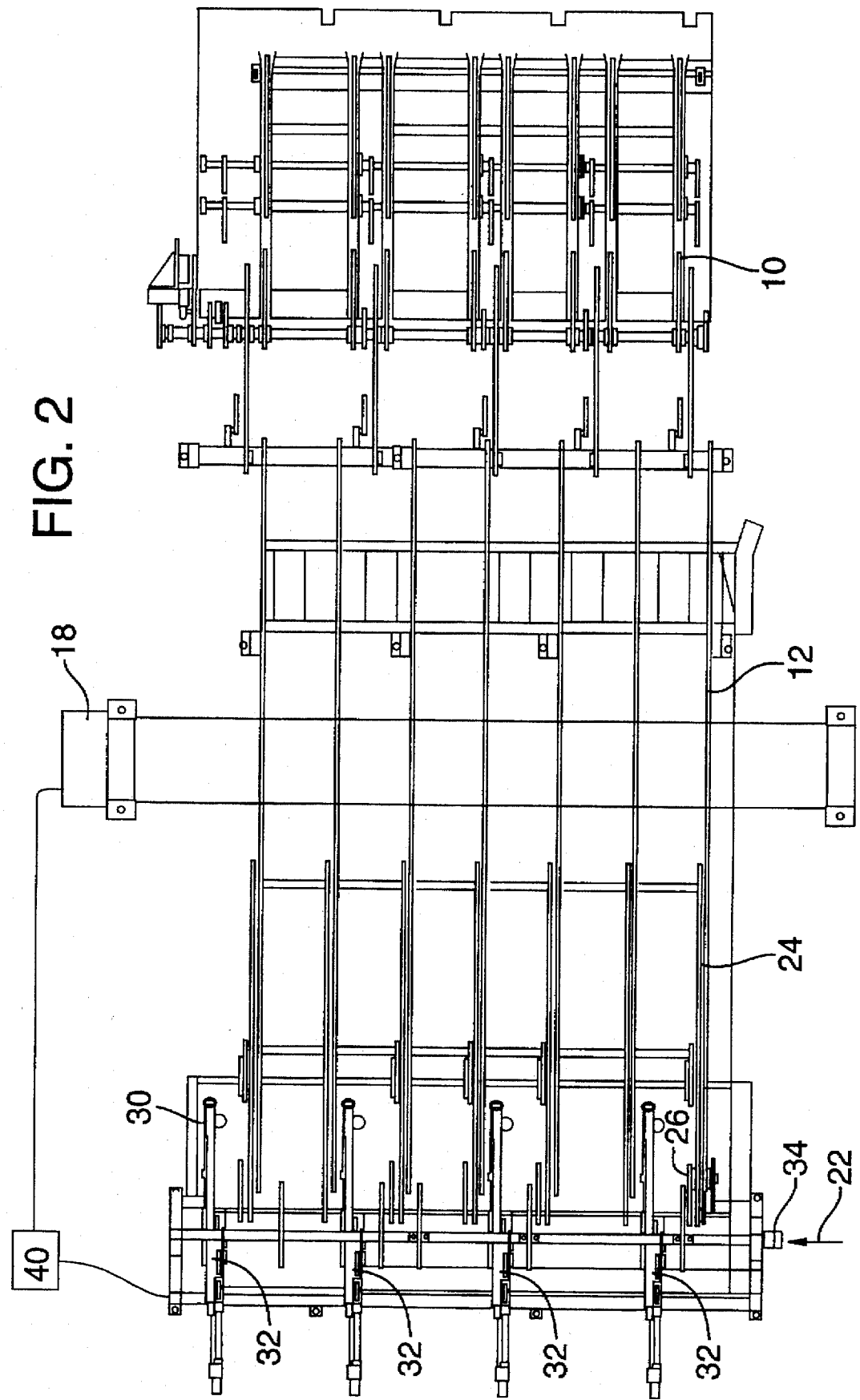
FIG. 2 is a top plan view of the infeed conveyor system of FIG. 1.

FIGS. 1 and 2 illustrate an infeed conveyor system of the present invention. The conveyor system includes a descrambler 10 that separates a stock pile of lumber products such as boards and delivers individual boards sequentially to a lugged type feed conveyor 12. The conveyor 12 has lugs 14 that will engage the side edge of a board 16 to propel the board 16 along the conveyor 12. A scanner 18 is provided to scan the boards 16 as they are conveyed by the conveyor 12. The scanner 18 will scan both the top and the bottom of the board 16 to obtain the length and width of the board as well as its profile. The scan data is input to a computer 40. A board turner 20 is provided to turn the boards 16 over if required as determined by the computer 40 from data input from the scanner 18. A friction type speed up conveyor 24 joins the lugged type feed conveyor 12 and is arranged to speed up the travel of the board 16. The speed up conveyor 24 is typically of the chain or belt type and runs at a higher rate than the lugged type conveyor 12. The speed up conveyor 24 will thus accelerate the board 16 and move it away from being propelled by the lug 14 and will advance the board 16 to the next lug 14 where it will be restrained by the lug 14. The board 16 as it approaches and is positioned relative to the board turner 20 will thus be forced against the lug 14 by the speed up conveyor 24.

The infeed conveyor system has a positioning lug conveyor 26 that is joined to the exit end of the lug conveyor 12 and is joined to the speed up conveyor 24. The positioning lug conveyor 26 has lugs 28 that are engageable with the board 16. The positioning conveyor 26 is arranged to position lugs 28 within a range to accommodate different widths boards. The range within which the lugs 28 may be positioned is indicated by 29.

The infeed conveyor system has placement pins or posts 30 that are provided strategic to the positioning lug conveyor 26. The placement pins 30 are reciprocally movable in the direction of the feed path of the conveyor 12 (indicated by arrow 44) and are further movable upwardly and downwardly to facilitate positioning the pins 30 relative to a board 16 that is engaged by the positioning lugs 28 of the conveyor 26. Cushioning posts 32 are provided on the opposite side of the board and function as a movable back stop that assumes the desired placement of the board by the placement lugs, i.e., overthrow of the board is thereby avoided.

The conveyors 12, 24 and 26 are referred to as transverse feed conveyors. That is, board 16 is transported transverse to its longitudinal length on the conveyors 12, 24 and 26. The infeed conveyor system further includes a longitudinal conveyor 34 that is positioned strategic to the conveyors 12, 24, and 26. The feed path of the conveyor 34 is normal to the feed path of the conveyors 12, 24 and 26. The conveyor 34 is arranged to convey the board 16 along its longitudinal length, e.g., indicated by arrow 22.

A computer 40 is provided to control the operation of the infeed conveyor system. The computer 40 will have data input from the scanner 18 and from the input data the computer will determine the proper orientation of the board 16 and will also determine which side of the board 16 should be facing upwardly. The computer 40 will control the operation of board turner 20 as required to turn the boards 16 that require turning. Additionally the computer 40 controls the individual and combined operations of the conveyors 12, 24, 26, 34 and the placement pins 30.

In operation the descrambler 10 of the infeed conveyor system will separate and deliver one board 16 at a time to the lugged feed conveyor 12. The infeed conveyor system is arranged such that a board 16 will be delivered to the lugged feed conveyor 12 between successive lugs 14 as indicated by board 16a in FIG. 1. Should a board 16 not be present on the descrambler 10 to be delivered between succeeding lugs 14, the infeed conveyor 12 will be stopped. When a board 16 is delivered by the descrambler 10 the conveyor 12 is re-started.

As the conveyor 12 progresses, the lug 14 will engage the trailing edge of the board 16 as indicated by the board 16b in FIG. 1. The lugs 14 will thus engage the trailing edge of the board 16 and will propel the board 16 at the desired spacing and in the feed path direction indicated by the arrow 44. The conveyor 12 will transport or convey the board 16 through the scanner 18 (having top and bottom scan units) where the board 16 is scanned and the scan data is input to the computer 40. The infeed conveyor 12 will continue to convey the board 16 using the lugs 14 of conveyor 12 until the board 16 reaches the speed up conveyor 24.

As previously mentioned, the speed up conveyor 24 runs at a higher rate than the lug conveyor 12 and is of the friction type. The conveyor 24 will accelerate and move the board 16 from being pushed by a lug 14 to a position against the preceding lug 14 where the board 16 will be restrained by the lug 14 as indicated by board 16c. The board 16c is thereafter conveyed by the combined action of conveyors 12 and 24.

The board 16 as it reaches the board turner 20 will be in position to be turned over if required. The computer 40 determines whether or not the board 16 is to be turned over from the scan data of the board 16. The speed up conveyor 24 assists the board turner 20 to turn the board 16 over. As the board turner 20 lifts the leading edge of the board 16, the trailing edge of the board 16 will be propelled by the speed up conveyor 24 to assist in turning or flipping the board 16 over.

The board 16 is then conveyed by the combination of the lug conveyor 12 and the speed up conveyor 24 to the positioning lug conveyor 26. The positioning lug conveyor 26 is designed for intermittent, precise start and stop movement so as to position the board 16 at a determined distance from the longitudinal conveyor 34.

The lugs 28 of the lug positioning conveyor 26 will restrain and hold the board 16 in position until the preceding board 16, which is being conveyed by the longitudinal conveyor 34, is moved clear. When the preceding board 16 has cleared, the lugs 28 of the conveyor 26 will be accelerated and will drop out of the feed path. At the same time at least a pair of the placement pins 30 (which have been raised) will engage the trailing edge of the board 16 toward a desired position over conveyor 34. In the process, the leading side edge of the board will engage cushioning pins 32 to assure proper positioning of the board 16 on the conveyor 34. Four cushioning pins 32 are illustrated in FIG. 2 and only two will typically be activated depending on the length of the board 16. The cushioning pins 32 and the placement pins 30 function as a placement mechanism to place the board 16 at the desired orientation on the conveyor 34. The board 16 as positioned on the conveyor 34 is gripped by overhead rollers 38 conveyed by the conveyor 34 to a subsequent processing station, e.g., a saw.

Figure 3:
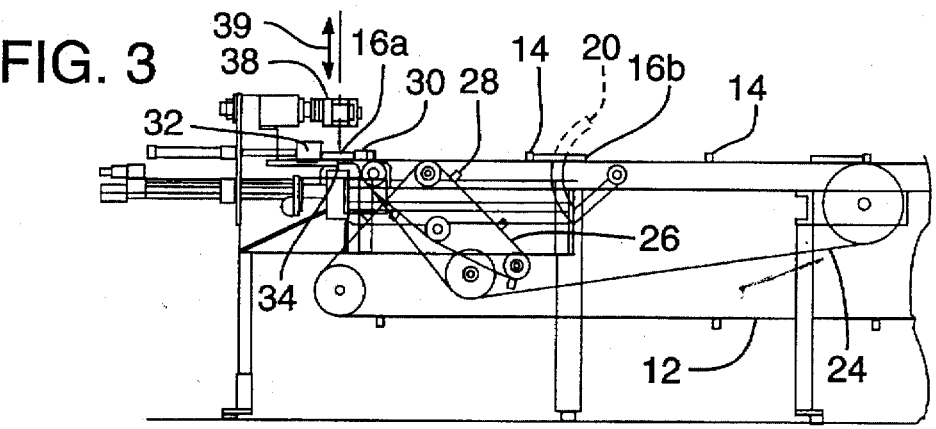
FIGS. 3–9 are views illustrating the transfer of a lumber product from a transverse feeding conveyor to a longitudinal feeding conveyor of the infeed conveyor system of FIG. 1.

Refer to FIGS. 3-9 which further illustrate the operation of transferring the board 16 from the transverse feeding conveyors 12, 24 and 26 to the longitudinal feed conveyor 34. FIG. 3 illustrates a board 16a moved in position to be fed by the longitudinal feed conveyor 34. The placement pins 30 have moved the board 16a to properly position the board 16a on the longitudinal feed conveyor 34 with the assist of cushioning pins 32. The longitudinal feed conveyor 34 includes known parking ramps 36 that are elevated to facilitate transferring the board 16 onto the conveyor 34. The conveyor 34 need not be stopped during the transfer of the board 16 since the parking ramps elevate the board 16 above the moving conveyor 34. The conveyor 34 also has press rolls 38 that will engage the board 16 when positioned on the conveyor 34 to facilitate guiding and feeding the board 16 on the conveyor 34.

Figure 4:
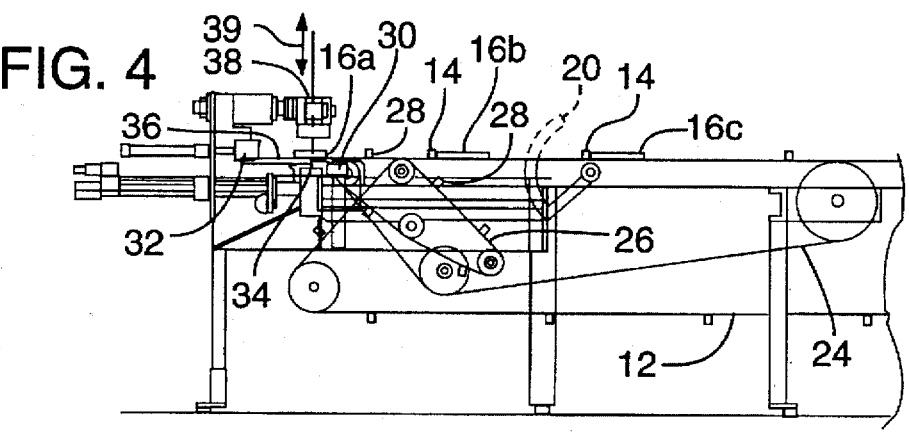

FIG. 4 illustrates the cushioning pins 32 having been retracted and the placement pins 30 having been lowered. The parking ramps 36 are lowering to place the board 16 on the conveyor 34 and the press rolls 38 are lowering to engage the board 16. Another board 16b is being conveyed toward the conveyor 34 by the lug conveyor 12 and the speed up conveyor 24. As shown the board 16b is being forced against the lug 14 of the conveyor 12 by the speed up conveyor 24. The positioning conveyor 26 is advancing to position a lug 28 in the proper position to restrain the board 16b when it is transferred onto the positioning conveyor 26.

Figure 5:
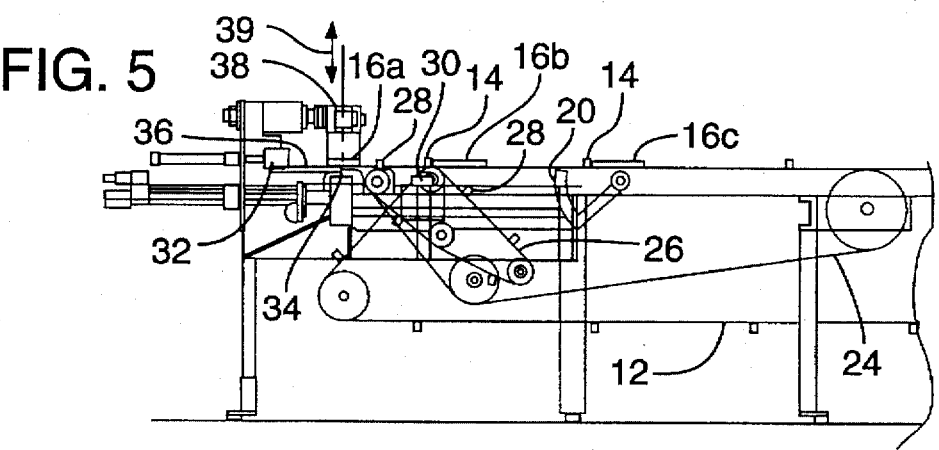

In FIG. 5 the ramps 36 and the press rolls 38 finish lowering and the board 16a begins to feed on the conveyor 34. The board 16b is progressing toward the conveyor 34 on the conveyors 12, 24. The positioning pins 30 are retracting to a position at the trailing side of the board 16b.

Figure 6:
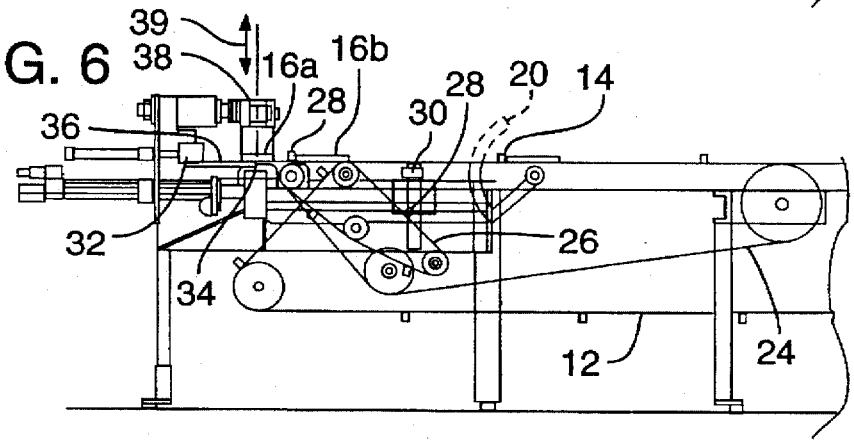

In FIG. 6 the positioning pins have fully retracted behind board 16b and the board 16a on the conveyor 34 is feeding. The board 16b has been transferred onto the positioning conveyor 26 and is being restrained by the lug 28. The speed up conveyor 24 urges the board 16b against the lug 28. The lug 14 of the conveyor 12 drops out of the feed path at the entry of the positioning conveyor 26 permitting the board 16b to advance against the lug 28.

Figure 7:
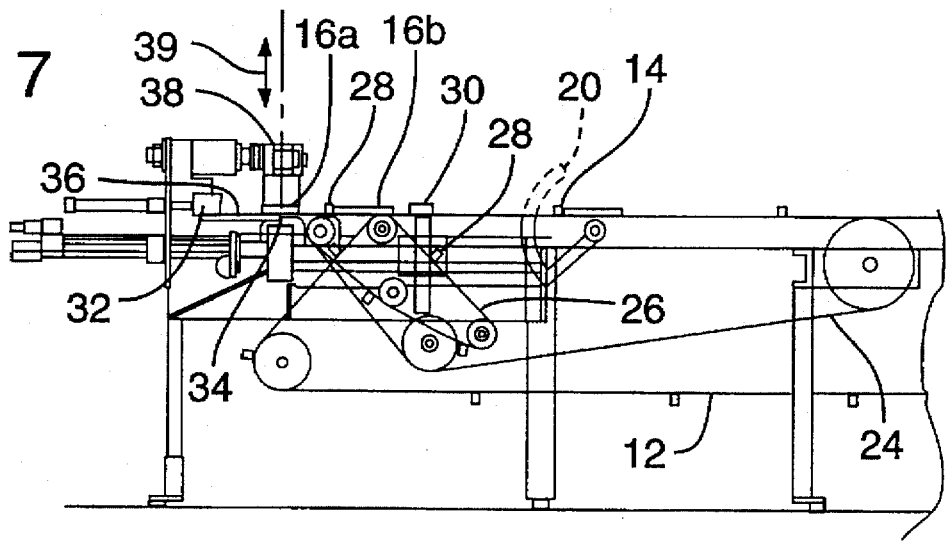

In FIG. 7 the board 16a is feeding on the conveyor 34. The positioning pins 30 are elevated and are in the ready position to engage the board 16b. As the board 16a is advancing on the conveyor 34 to be nearly clear of the board 16b the lug 28 of the positioning conveyor 28 and the placement pin 30 begin to accelerate.

Figure 8:
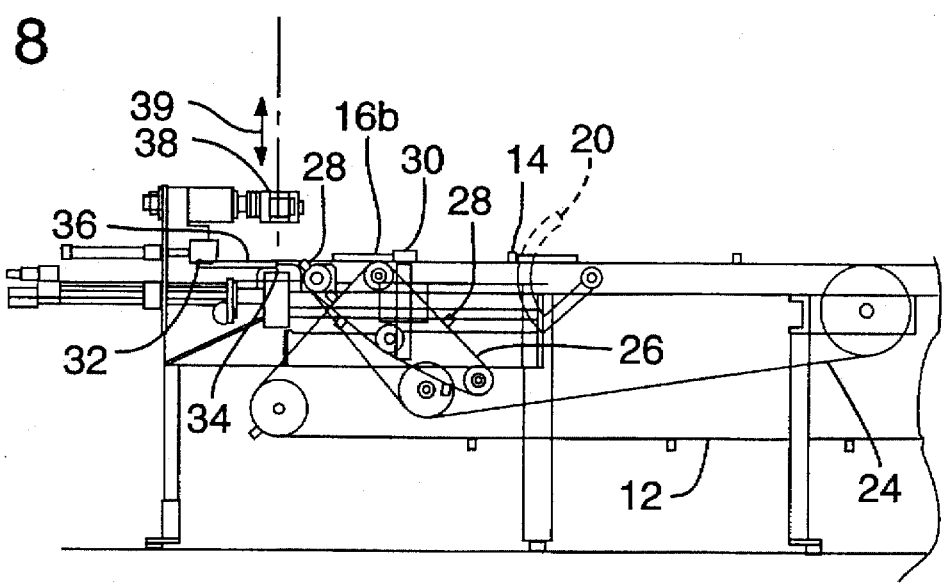

In FIG. 8 the board 16a is clear of the travel path of the board 16b. The parking ramps 36 and the press rolls 38 are elevated. The positioning lug 28 moves (as does board 16b) and the placement pin 30 engages and begins to move the board 16b toward the conveyor 34.

Figure 9:
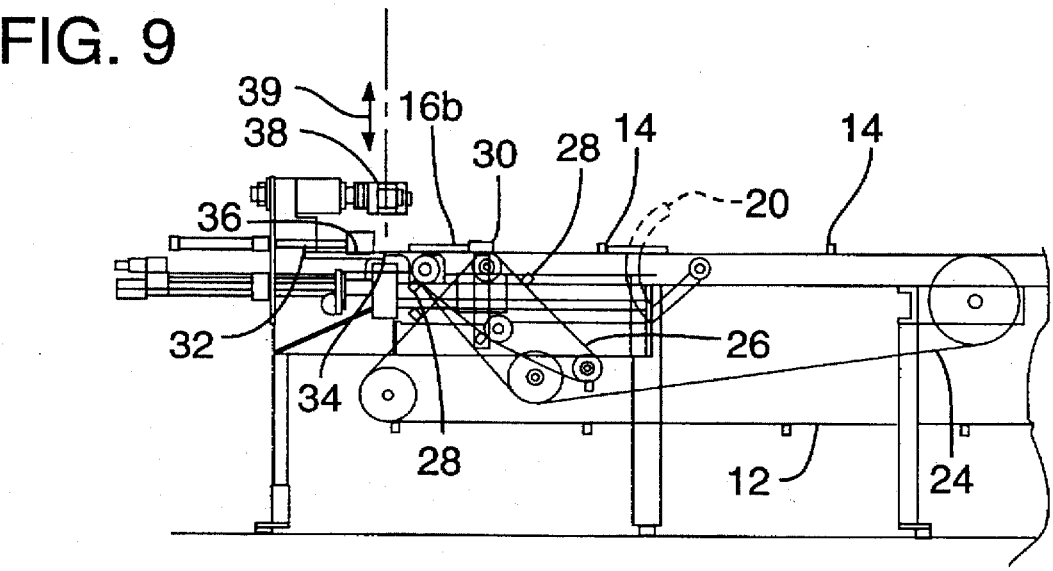

In FIG. 9 the parking ramps 36 are fully raised and the lug 28 of the positioning conveyor 26 drops out of the path of conveyance. The placement pins 30 continue to move the board 16b toward the conveyor 34. The cushioning pins 32 are advanced to a position over the conveyor to work in conjunction with the positioning pins 30 to accurately position the board 16b on the conveyor 34 in the same manner as board 16a is positioned on conveyor 34 as illustrated in FIG. 1. The board 16b is moved onto the conveyor 34 by the placement pins 30. The board 16b is now in position to be conveyed by the conveyor 34.

As previously mentioned, the infeed conveyor system is controlled by the computer 40. From the data input from the scanner 18, the computer 40 will determine the profile of the board 16 and will also determine which face of the board should be placed upwardly for the subsequent operation that is down line from the longitudinal conveyor 34. The computer will also control the lugged feed conveyor 12 to receive a board 16 between adjacent lugs 14. Should the descrambler 10 not deliver a board between adjacent lugs 14, the computer will stop the lugged conveyor 12 until a board is received on the conveyor 12. The computer 40 will control the motion of the conveyor 12 such that if it is required to stop the conveyor 12, a board will not be in position under the scanner 18 since to have an effective scan the board must be in motion. The computer 40 will also stop the conveyor 12 when a board has reached the board turner 20 and it is required to turn the board 16 over to present the opposite face to the top side. The computer 40 further controls the positioning conveyor 26 to position a lug 28 at the proper distance from the conveyor 34. The positioning of the lug 28 of the conveyor 26 will depend on the width of the board 16 and the acceleration capability of the placement pins 30 to optimize the positioning of the board on the conveyor 34.

The infeed conveyor system of the present invention thus will transfer boards 16 onto the longitudinal conveyor 34 with minimum gaps between succeeding lengths of boards 16. The arrangement of the positioning conveyor 26 in conjunction with the placement pins 30 are all arranged to accommodate boards of differing widths and lengths. The infeed system of the present invention provides a continuous rate of flow of boards 16 onto the longitudinal conveyor 34 which is desired for subsequent operations.

Those skilled in the art will recognize that modifications and variations may be made without departing from the true spirit and scope of the invention. For example, the positioning lugs 28 may be provided on a linear motion member similar to placement pins 30 and the combination of pins 30 and lugs 28 may be combined with different conveying systems. The invention is therefore not to be limited to the embodiments described and illustrated by is to be determined from the appended claims.

We claim:

1. A conveyor system comprising:
   a lateral lumber piece conveyor conveying lumber pieces oriented laterally on the conveyor and in a direction from one end of the conveyor to a second end of the conveyor;

a lengthwise lumber piece conveyor positioned at said second end of the lateral lumber piece conveyor and receiving said lumber pieces oriented longitudinally on the conveyor and conveying the lumber pieces in a direction substantially normal to the direction of conveyance of the lateral lumber piece conveyor;

a transfer mechanism transferring the lumber pieces from said lateral lumber piece conveyor to said lengthwise lumber piece conveyor comprising:

(a) movable positioning lugs selectively positioned in the path of the lumber pieces at the second end of the lateral lumber piece conveyor and selectively holding the lumber pieces until movement thereof onto the lengthwise lumber piece conveyor is desired;

(b) movable placement pins movable between a position behind the lumber pieces held by the movable positioning lug, toward the lengthwise lumber piece conveyor and behind a subsequent lumber piece; and (c) a control controlling the positioning lugs and placement pins for positioning each lumber piece in sequence at a desired position short of the lengthwise lumber piece conveyor and for releasing and accelerating the lumber pieces onto the lengthwise lumber piece conveyor as each previous lumber piece is moved by the lengthwise lumber piece conveyor out of the way of the subsequent lumber piece.

2. A conveyor system as defined in claim 1 wherein said lugs are provided on a belt conveyor that extends in part along a path of conveyance of said lateral lumber piece conveyor, said lateral lumber piece conveyor positioning lumber pieces against a lug of said belt conveyor and said belt conveyor controlled by said control to selectively position the lug and thus a lumber piece relative to the lengthwise lumber piece conveyor.

3. A conveyor system as defined in claim 2 including resistively retractable cushioning pins located relative to the lengthwise lumber piece conveyor and in the path of the lumber piece to control advancement of the lumber piece and assure the desirable placement of the lumber piece on the lengthwise lumber piece conveyor.

4. A conveyor system comprising:

a first endless conveyor receiving boards in a crosswise orientation at one end and including lugs for engaging and moving the boards along a conveyor path toward an opposite end;

a second endless conveyor joining the first endless conveyor and engaging said boards by friction engagement, said second endless conveyor running faster than said first endless conveyor and moving said boards relative to said first conveyor to the preceding lug on said first conveyor where the board movement is controlled by said first conveyor restraining the movement of the boards; and a computer controlling operation of the conveyors.

5. A conveyor system as defined in claim 4 including:

a third endless conveyor having positioning lugs entering the conveyor path and joining the second endless conveyor belt, said first endless conveyor withdrawing from said conveyor path at the point of joining of the third conveyor, said lug of the third conveyor cooperative with the second conveyor for controlling the positioning of the boards along the remainder of the conveyor path and independent of the running of the first conveyor.

6. A conveyor system as defined in claim 5 including a lengthwise conveyor system perpendicular to the conveyor path and having a receiving station at the end of the conveyor path, said third conveyor and the lugs thereof controlled by the computer to position the boards relative to the receiving station of the lengthwise conveyor, and a placement mechanism positioned to receive boards from the third conveyor and for placing the boards on the lengthwise conveyor at said receiving station.

7. A conveyor system as defined in claim 6 including a scanner positioned along the conveyor path in the portion of board conveyance controlled only by the first conveyor, said scanner determining a desired orientation of the board on the lengthwise conveyor, said placement mechanism placing the board at the desired orientation on the lengthwise conveyor.

8. A conveyor system as defined in claim 7 including a board turner positioned along the conveyor path after the scanner and along the portion where the board conveyance is controlled by both the first and second conveyors, said scanner determining a desired up and down position of the boards and controlling the first conveyor and board turner for inverting the boards in response to the scanning thereof.

* * * * *